United States Patent
Rougier

(10) Patent No.: US 10,136,322 B2
(45) Date of Patent: Nov. 20, 2018

(54) ANONYMOUS AUTHENTICATION SYSTEM

(71) Applicant: Kirio Inc., Lynnwood, WA (US)

(72) Inventor: Franck D. Rougier, Seattle, WA (US)

(73) Assignee: Kirio Inc., Lynnwood, WA (US)

( * ) Notice: Subject to any disclaimer, the term of this patent is extended or adjusted under 35 U.S.C. 154(b) by 0 days.

(21) Appl. No.: 15/958,486

(22) Filed: Apr. 20, 2018

(65) Prior Publication Data

US 2018/0310174 A1 Oct. 25, 2018

Related U.S. Application Data

(60) Provisional application No. 62/488,209, filed on Apr. 21, 2017.

(51) Int. Cl.
| | |
|---|---|
| *H04W 12/06* | (2009.01) |
| *H04L 9/32* | (2006.01) |
| *H04W 12/04* | (2009.01) |
| *H04L 9/08* | (2006.01) |
| *H04L 29/06* | (2006.01) |
| *H04W 56/00* | (2009.01) |

(52) U.S. Cl.
CPC ........... *H04W 12/06* (2013.01); *H04L 9/0816* (2013.01); *H04L 9/0861* (2013.01); *H04L 9/0894* (2013.01); *H04L 9/3297* (2013.01); *H04L 63/0838* (2013.01); *H04L 63/0846* (2013.01); *H04L 63/107* (2013.01); *H04W 12/04* (2013.01); *H04W 56/001* (2013.01)

(58) Field of Classification Search
CPC ............................ H04W 12/06; H04L 9/3297
See application file for complete search history.

(56) References Cited

U.S. PATENT DOCUMENTS

| | | | | |
|---|---|---|---|---|
| 6,148,404 | A | * 11/2000 | Yatsukawa | ............ G06F 21/335 380/30 |
| 9,596,223 | B1 | * 3/2017 | Mezei | ................. H04L 63/0838 |
| 2017/0208038 | A1 | * 7/2017 | Hinaman | ............ H04L 63/0272 |
| 2017/0318008 | A1 | * 11/2017 | Mead | ................. H04L 63/1466 |
| 2018/0007037 | A1 | * 1/2018 | Reese | ................. H04L 63/0838 |

* cited by examiner

*Primary Examiner* — Christopher M Brandt

(74) *Attorney, Agent, or Firm* — FSP LLC

(57) ABSTRACT

A system and method anonymously authenticate utilizing multiple pre-shared identification keys with external visual identifier. Two keys are pre shared with a server and are integrated into memory on a controller, and external visual identifiers are affixed to the outside of the controller. The server authenticates the mobile device by checking that the external visual identifiers are appropriately linked to the pre-shared keys within a control memory structure, and a second control memory structure is initiated utilizing the shared key and no user-identifying information.

11 Claims, 9 Drawing Sheets

ANONYMOUS AUTHENTICATION SYSTEM

CROSS REFERENCE TO RELATED APPLICATIONS

This application claims the benefit of U.S. provisional patent application Ser. No. 62/488,209, filed on Apr. 20, 2017, the contents of which are incorporated by reference herein in their entirety.

BACKGROUND

Privacy and security are becoming increasingly important with the proliferation of IOT devices and automation in everyday life. Users wish to maintain a level of privacy, which allows for enhanced security, while at the same time, manufacturers and providers of IOT services must verify that devices are not counterfeit and also provide a means to access and identify devices to a network and the end user. There is a need for a way to authenticate devices and operate automation networks while at the same time providing privacy buffer to protect the user's private information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
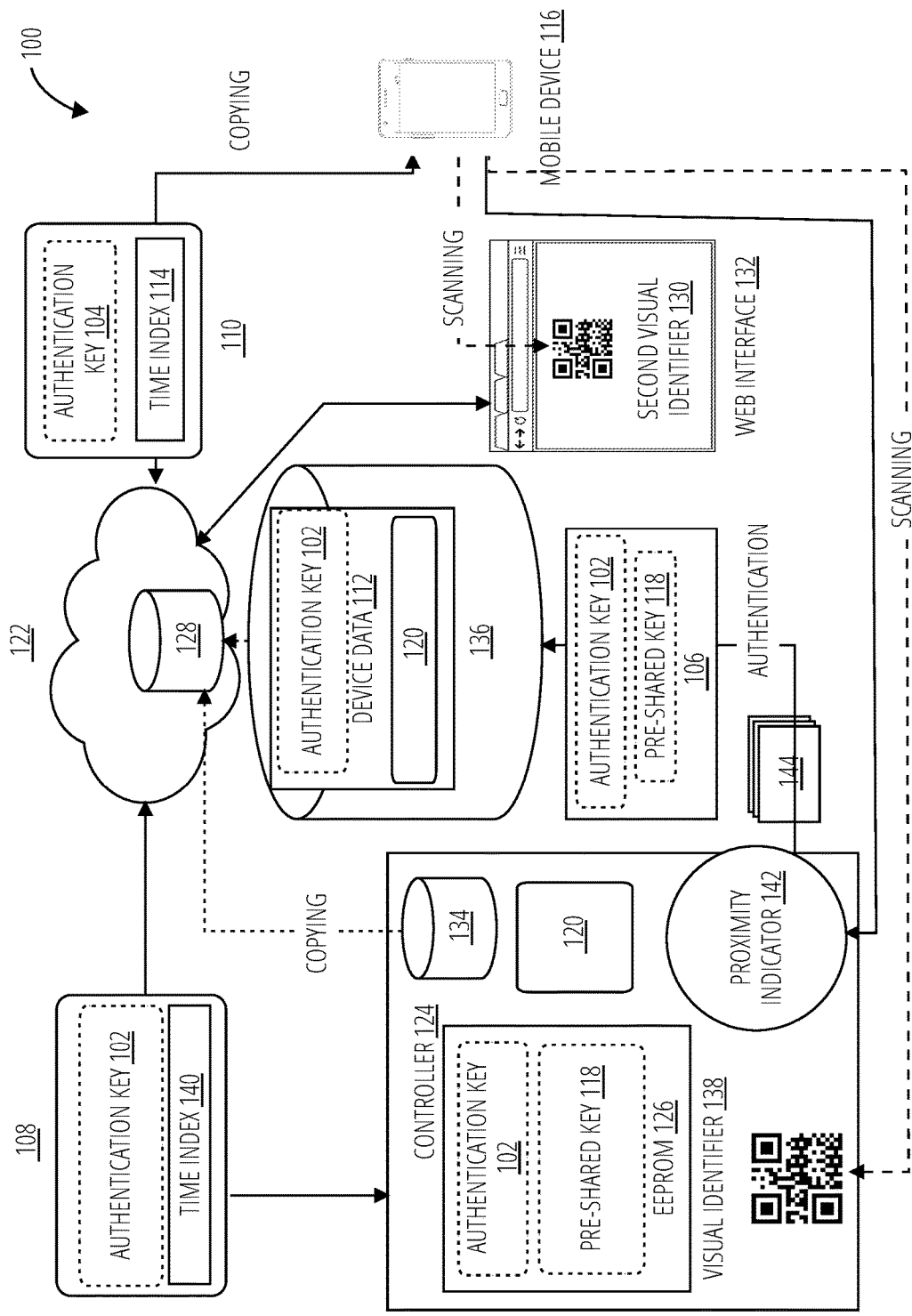
FIG. 1 illustrates an embodiment of an anonymous authentication system 100.

Various terminology is used herein and should be accorded its ordinary meaning in the art unless otherwise indicated explicitly or by context.

"Visual identifier" herein refers to a machine or human readable identification, for example a barcode or QR code.

"Proximity indicator" herein refers to logic to indicate the location of the user, this may be a button or gps coordinate from a mobile device.

"Controller" herein refers to an automation network controller to control a network of machines and devices, for example a home automation controller.

Imprinted in an EEPROM, or any other cryptographic chip which can be securely programmed during manufacturing, in the controller or mobile device, there may be an authentication key code ("secret") and a universally unique identifier ("UUID"). These may use any standard length or mix of characters known in the art. The authentication key may be hashed so that the program that reads it may decipher the information. The EEPROM does not include any other information than the concatenated strings with no identifier or field dividers. This ensures that the parsing of this long resultant string is only available to the intended application and assure some level of protection if the EEPROM is read by an untrusted application ("attacker") There may be a separate computer application with a database. It creates the secret/UUID combination, then directly programs the EEPROM. Other unique information may also be written such as the manufacturing date and other tokens. The unique identifiers are generated using well known generation algorithms and this application maintains the uniqueness of the UUID. During the EEPROM information generation, a serial number ("serial") and an easy to type code ("tab code") are also generated and stored in the same manufacturing database. The serial and tab code combination are linked to the UUID in the database. It is important to note that the serial and tab code are not stored onto the EEPROM. Hence, the device does not have any visually legible serial information electronically written to it when it leaves the manufacturing plant. The serial information may be encoded as a Quick Response Code label (QR label) and the tab code as human legible text. The QR can be substituted for any other Near Field Communication (NFC), Radio Frequency Identifier (RFID), light-strobe patterns or other contactless transmission methods. The human legible text acts as a backup in case the electronic means of communication or scanning (i.e. broken camera . . . ) are unavailable.

The database stored in the manufacturing application is later moved using well-known secured-batch processes to a central Internet-based database. This database of manufactured devices contains among other data, information linking UUID, secret, serial and tab code.

This database is further secured using methods used in the art and access is mediated via an authenticated API (Application Programming Interface) and LAN (Local Area Network) firewall. In our invention, the database is only accessed by a single process ("cloud-server").

There are different stages of the mobile device lifecycle, for example a manufacturing stage, an installation stage where the manufactured device is installed and commissioned in an office or residential building. The installer either scans the serial information or types in the tab code in an installation application. This installer application contains a particular project with all information required to activate the controller. By entering the serial information, the controller is able to subsequently find its linked project by the cloud-server mediation.

Controller Initialization and Commissioning

As the controller starts, it is able to securely connect to the cloud-server application using well known encryption techniques (such as Transport Layer Security) used when communicating over public networks like the Internet. It authenticates against the cloud-server using its UUID and a type of time-based HMAC (Hash-based Message Authentication Code) computed using the secret embedded in its EEPROM.

The cloud-server application using the UUID submitted by the controller, looks up the secret, serial and tab code previously uploaded from the manufacturing database. It computes a separate HMAC using its own secret and compares it with the controller's. When both HMAC match, the cloud-server subsequently looks up in the installation application's database using the serial or tab code, the project which is linked to this particular controller.

The cloud-server automatically generates programming, exhaustive configuration information and a new unique ID ("Home ID") in order to prevent the UUID to be transmitted again. This information is returned to the controller. The controller can finally implement the programming configured by an installer for a particular project. The controller only requires this initial Internet bound connection in order to download its foundational payload from the cloud-server. Thereafter, the controller does not require any connections with the cloud-server or the Internet. This connection is however required in order to receive system updates or allow a user to access their controller from outside their LAN among other functionalities.

The secret information is never transmitted electronically. Instead, whenever authentication is needed, an HMAC is transmitted along with the Home ID (now used instead of the UUID). The controller acting as a client, always authenticates with this cloud-server.

Hash-based message authentication codes are also known in the art as keyed-hash message authentication codes. They represent a type of message authentication involving a hash function and a secret cryptographic key. They are not message encrypting functions but instead they ensure authentication and message integrity. HMAC generation algorithms are well understood and multiple hashing functions can be used. They can be static, in which case they rely on computing power for protection and their resultant HMAC's are also static. Static HMAC, especially in our domain, can be used in replay attacks.

Time-Based One-Time Password

This invention may utilize a time-based HMAC generation algorithm. This TOTP (Time-based One-Time Password) algorithm uses the shared secret between the controller and the cloud-server, and the current timestamp to create a one-time password. The main difference between this authentication method and others currently available, is that the TOTP is not displayed to the end application or user. Typically, a secret is used to create a QR code which is used as part of a two-factor authentication. The pre-shared secret could easily be compromised because it is transmitted over the Internet, then displayed on a computer screen which is finally copied to a special authentication application. In this traditional approach, the application generates the TOTP which is copied or manually entered in the target application. In our invention, the computed TOTP is embedded in every message and the controller's authentication key is never displayed. This is accomplished by pre-sharing offline the authentication key or secret.

User Anonymous Authentication

The first user may become the master user using a multi-factor authentication scheme where the user and her personal information are never shared. During the pairing of the mobile device to the controller, no personally identifiable information is received from the user. Our authentication approach differs from most systems which use email addresses, telephone numbers, passwords and other user personal information combination. To establish trust, we rely on user knowledge factors such as her Wi-Fi password, LAN encryption certificate, physical location of the controller within a building etc. . . . . In addition, possession factors such as keys to the room where the controller is installed, general access to the home, ability to interact with the controller (press buttons on the controller and revealing the QR code affixed). Finally, inherence factors such as end user's mobile device GPS data are also used and the cloud server and the device ID labeling during manufacturing. The TOTP (a Time-Based On-Time Password, e.g., a Keyed-Hash Message Authentication Code) result is used as a token to access the controller later. The controller comprises no internal record of the external labels and serial numbers affixed to it. The device ID (different from the label) is used to activate the controller during the pairing and installation process.

The system may utilize a TOTP. This may be a classic TOTP implementation with a cryptographic function and a secret code. The system may use a physical location check, which may require the user to be present at a relative geo-location while the mobile device is being authenticated. The system may use geo-fencing to further establish the physical location of the user when accessing wirelessly (e.g., via WiFi). It may disallow authentication of a user based on incorrect location, but in some embodiments may not require a strict check of the GPS location of the user. In addition, the system may utilize the boundary of a building and its assumed security to control access to the mobile device and ensure that only authorized users in the space of the building have physical access to the controller. The process may require the use of a physical proximity indicator, for example, a button on the controller mobile device, this gives two factors, the scanned device ID and either the GPS location of the user or the physical proximity indicator.

An application on the user's mobile device connected to the same network as the controller can enter pairing by either scanning the QR code or typing the tab code. The application sends this information along with other relevant information (mobile device ID, make, model, application software version, current GPS location, current date time etc. . . . ) to the controller. The controller asks the user to verify their physical presence by pressing a button. In order to associate an installation to a given project that an installer is commissioning, the installer uses the device ID which is looked up in the database, and on a one time basis the associated controller is activated in a setup control memory structure. This database has some unique identifying information about the location of where the device is installed, for example, GPS, street address, etc. At commissioning, in the cloud-based server and database, only the information about the controller and the authentication key are transferred to an anonymous user control memory structure. This database may contain some GPS information to determine from temporal and astronomical information deduced from latitude and longitude (dusk, dawn, etc. . . . ), however, nothing specific like the builder or installer info, installation date, address or customer personally identifiable information. The setup control memory structure (installer) and the user control memory structure (customer) may be firewalled from one another, so that only information about the controller itself and the authentication key are transferred to the user control memory structure. The controller mobile device is now commissioned; the authentication key is never transferred again. The system may calculate the TOTP utilizing the authentication key first for communication between the controller and the cloud server.

User Local Authentication

The first user may become the master user using a Multifactor Authentication scheme whereby the user and his or her personal information stay anonymous. An application on the user's mobile device takes a graphical representation of an identification code and sends it to the devices or system the user wants to access. This controller determines if it is the first user and the user becomes the master user. The master user role entails authorization of other new users (new clients who have to be authenticated as new users) and administrative management of the controller. Any subsequent user is deemed a normal user and requires master approval to access the controller.

Completing the process, the pre-shared key for communication between the client, the controller, and the cloud server. The database may be secured using normal techniques known in the art. The user using their personal mobile device ensures that they are connected to their home's WiFi or local network. Additionally, the controller is attached to the same WiFi or local network where the mobile device is connecting. The user extracts the visual identifier, and using the app previously installed on the mobile device, scans it. The visual identifier, along with unique information concerning the mobile device, are sent to the controller, then to the setup control memory structure for check-in. The controller mobile device comprises a database of clients, for example, information about the mobile device, the operating system information, IP address (which may change) and a unique identifier (ID) for the mobile device. This information is sent to the cloud server along with the registration information uniquely identifying that client. When the unique ID is unmatched in the database, the controller generates and returns in the response a new secret only valid for the present registration. The secret is used to compute the TOTP for all requests, and is attached to this mobile device and its unique ID. The mobile device also implements the same algorithm for the TOTP computation to validate the controller using the shared secret that is exchanged once within the local home network. When the mobile device sends an action to the controller, it sends the TOTP computation result, the Time-Based On-Time Password (TOTP) along with the command. This TOTP may be sent using standard Internet encryption protocols, for example, HTTPS or secured WebSockets. The TOTP is inserted in the message header in order to keep it private. The TOTP may never be sent in an un-encryptable form such as a query string or Universal Resource Locator (URL). The TOTP is sent to the controller which computes its own TOTP based on the previously generated and shared secret. The controller then compares the supplied TOTP and the computed TOTP. If they match, the controller allows access to the resource. The TOTP is constantly updated within a given time window, for example every 30 seconds. This is possible because the TOTP algorithm contains a time dependent parameter. Hence, the mobile device and the client must share a clock that is synchronized to within the time window.

After a new client is registered on the local network, the controller may synchronize its local user database to the server database using the first authentication generated TOTP (using the respectively embedded authentication key). During this encrypted and protected session, the controller and server verify each other's TOTP and then the registered client's secret is stored on the memory structure of the server, and from there to a database.

When the user uses the mobile device outside of a local WiFi boundary, the client application (app) connects to the cloud server acting as a proxy. Similarly, when the controller connects to the Internet, it finds the home through a DNS request and connects to the same cloud server. During connection of both the app and the controller, the secret and authentication key are used to create a first and second TOTP, respectively. The cloud server keeps a record of both and is able to generate the TOTPs for each and compare their authenticity. When it succeeds, the cloud server proxies the message from the app to the controller. The controller makes a secondary check using its locally stored secret for this client. If the TOTP for this particular client matches the computed TOTP, access is granted and the command request can be processed.

The cloud server receives GPS information and may prevent access based on a geolocation parameter, schedule, or Access Control Lists (ACL). This allows the master user to define who can access what resource from where and when.

In the event that a master user loses their previously paired mobile device, a button on the mobile device allows resetting all the generated secrets for all masters and deletes their records. In addition, all regular users' records are kept, but a new secret is generated for each. If the controller is connected to the Internet, a command removing all masters is sent to the server. This command prevents partial synchronization of a master list (which can contain a large number of master records) which can leave the cloud server vulnerable if the master reset was malicious. Finally, a synchronization of the regular users' secrets is made with the server's database.

Regular users are now unable to connect to the controller directly on the WiFi network or through the cloud-server. This is because their TOTP and the computed TOTP will not match. Their accounts are now in a pending approval state so that they cannot elevate their access rights by removing the master users. The next mobile device/user to pair will become the defacto master which will follow the previously discussed procedure. The new master now may approve previously paired but unauthenticated regular users by moving them from the pending approval state to approve. The new master re-pairing is deemed secured as long as the premises where the controller is located is secure.

Time Synchronization

The controller assumes all clients will have their own synchronized time source. The controller itself may synchronize with a valid and referential time stamp like the National Institute of Standards and Technology (NIST) or any other commonly accepted time source known in the art. In the EEPROM is contained the valid date and time of manufacture of the controller. When the controller starts, the CPU may default to its own invalid date and time. The control structure in the controller's RAM checks to see if the current system's time is before the manufacture date. If it is, the control structure creates a flag noting that the current date and time is invalid and all TOTP computation will fail even if the TOTP from the client or cloud-server is valid. If Internet connectivity is available, when the controller attempts to connect to the cloud-server, it also sends its current date and time noting that it is invalid. The cloud-server denies access because the TOTPs do not match, but in the response sends its own valid date and time. The controller updates its internal clock to match the server's. It then reattempts to connect with a newly computed TOTP using the server's time.

In the event an Internet connection is unavailable and the time clock on the controller is still marked invalid using the procedure described above, when a client connects, sends a command or attempts to register, it always embeds its own time stamp in the request headers. If the controller has marked its time as invalid, it uses the connected client's time stamp as the basis for its TOTP computation. If the TOTP check succeeds using the client's time stamp, the controller updates its internal clock to match the last requesting client but still keeps the invalid date and time flag. When a subsequently different client connects, the controller sends a command or attempts to register, the TOTP is first computed using the current time. If it succeeds using the current time then the invalid date and time flag is cleared. In the event that it fails using the current time, the subsequent client's mobile device timestamp is used to compute the tentative TOTP. If it succeeds, the controller allows access and then updates the current system's date and time, only if it is after the manufacture date. It keeps the invalid date and time flag set in order to hunt for separate clients sharing a date and time within the TOTP time window.

This synchronization algorithm is essentially hunting for the "vote" of two separate devices with current times within the TOTP time window of each other. This doubly checked window becomes the official time. Subsequently, if a $3^{rd}$ user attempts to register with a shifted time, the controller will send a message requesting a reset or connection to the Internet to acquire a new valid date and time. If the $3^{rd}$ user was previously registered and approved, their time stamp is used to check the TOTP if it succeeds, the system clock is updated with that mobile device timestamp, and the flag is once more raised.

Because the authentication system discussed in this system uses no traditional user login info (e-mail address, telephone number, password and user name pairs), temporary accessing the controller from another mobile device such as a computer or tablet may be accomplished in the following manner. By way of example, consider a web site containing advanced features such as granular reporting. The user accesses the website and is presented with a specially generated second visual identifier. This identifier is related to a unique session ID stored in the cloud-server memory structure. The user is invited to scan from their previously paired app. Upon scanning, the app submits the second visual identifier along with a computed TOTP to the cloud-server. The cloud-server can authenticate the TOTP against its own computed TOTP (from stored pre-shared key), then lookup the visual identifier corresponding session ID and grant access to the web interface. Now, the session ID is used as an alias to the app's TOTP, granting access similar to the app on both the cloud-server and the controller. This session has a given lifetime and then expires requiring the user to re-authenticate against a new second visual identifier.

The visual identifier may be printed along with a human readable alphanumerical code to be used when a camera is unavailable. This alphanumerical code is static alias code to the visual identifier which is stored in the controller at manufacturing time and shared with the cloud-server. In cases where a web system which is controlled or started by a third party requests access to the controller via the Internet (proxied by the cloud-server), or when access is performed on the mobile device where the app is installed, the user may be unable to switch over to his app and use the camera or scanning feature. In those cases, the use of human readable visual identifier alias is required. The requesting system will be authenticated as a regular user requiring the previously discussed proximity and GPS checks and follow the approval request from a master so that the third party service is essentially another user. Upon a master's approval, the third party can issue commands to the cloud-server then onto the controller. Master users reset will force a disconnection for the service and a new request will be required.

If the app is removed from the mobile device and a subsequent installation is performed, the app requests, when available and permitted, the unique ID of the mobile device. The request to the controller will succeed with automatic enrollment due to the fact that an app deletion does not remove the user on the controller. User removal is done by the master users. This saves the user time by not performing a new enrollment.

If the controller mobile device is cloned in such a way that the authentication key and unique identifier therein stored, the cloud server will prevent both devices to access the cloud server on the originating IP address. That is, if 2 clones try to register from 2 separate IP addresses, both will be marked inoperative and the proxy from any Internet-based client will be denied. These are counterfeit and copying protection measures. The other counterfeit scenario includes a cloning but change of the authentication key in the EEPROM in such a way this cloned mobile device would attempt to connect as a new mobile device to the cloud-server. Since the authentication key is shared from manufacturing data, the authentication key will be missing preventing an authentication of the TOTP and will prevent the controller from connecting to the server.

In both counterfeit scenarios, installation of the controller in a given premises will fail, since the server contains the initial configuration data required for the controller to become active. The downloading of this activation data is secured using the authentication key computed via the TOTP using the authentication key and yielding a matching TOTP on the both sides.

The anonymous authentication system 100 comprises an authentication key 102, an authentication key 104, a TOTP 106, a TOTP 108, a device data 110, a time index 112, a mobile device 114, a pre-shared key 116, a cloud server 120, a controller 122, an EEPROM 124, a user control memory structure 818, a second visual identifier 126, a web interface 128, a user control memory structure 130, a setup control memory structure 132, a visual identifier 134, a time index 136, and a proximity indicator 138.

The controller 122 transmits a TOTP 106 comprising an authentication key 102, a time index 136 to authenticate to a cloud server 120 and transmits the device ID 118 to the cloud server 120 the cloud server 120 authenticates the TOTP 106 and associates the user control memory structure 130 with the controller 122 in the setup control memory structure 132. The proximity indicator 138 may be used to indicate the user is physically present by the controller 122 during activation and authentication. The pre-shared key 116 may be pre-shared with the 120 and recorded on the EEPROM 124 when the controller 122 is manufactured. The mobile device 114 may be required to scan the visual identifier 134 to demonstrate that the user is physically present by the controller 122. The mobile device 114 may pair to the controller 122 via the visual identifier 134 and the proximity indicator 138. The controller 122 may then transmit the authentication key 102 to the mobile device 114. The mobile device 114 may authenticate to the cloud server 120 with the TOTP 108 using the authentication key 104 and the time index 112. The web interface 128 may access the cloud server 120 and the controller 122 by authenticating via the TOTP 108 and the second visual identifier 126.

Figure 2:
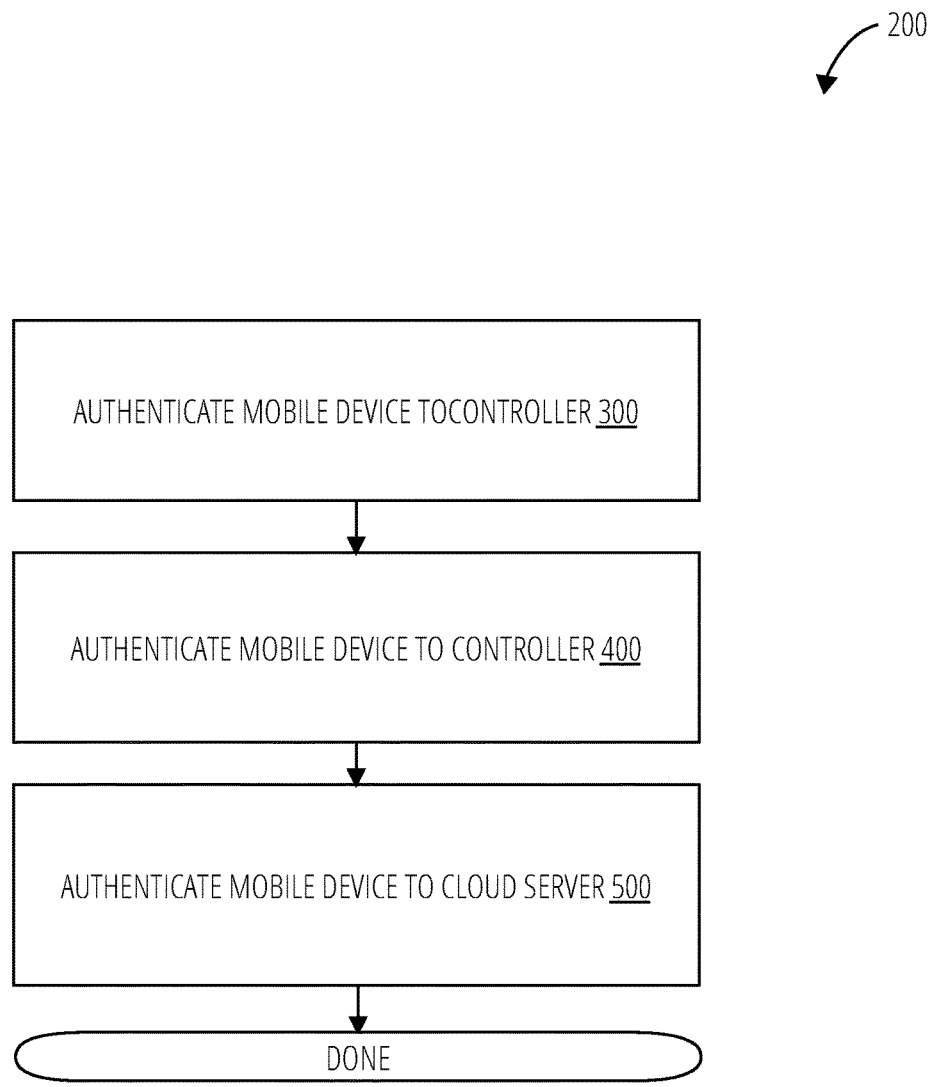
FIG. 2 illustrates an anonymous authentication process 200 in accordance with one embodiment.

Referring to FIG. 2, the anonymous authentication system 200 authenticates a mobile device to a controller (block 300).

The anonymous authentication system 200 authenticates the controller to a cloud server (block 400).

The anonymous authentication system 200 authenticates the mobile device to the cloud server (block 500).

A process authenticates a mobile device to a controller. The process then authenticates the controller to a cloud server. The process then authenticates the mobile device to the cloud server.

Figure 3:
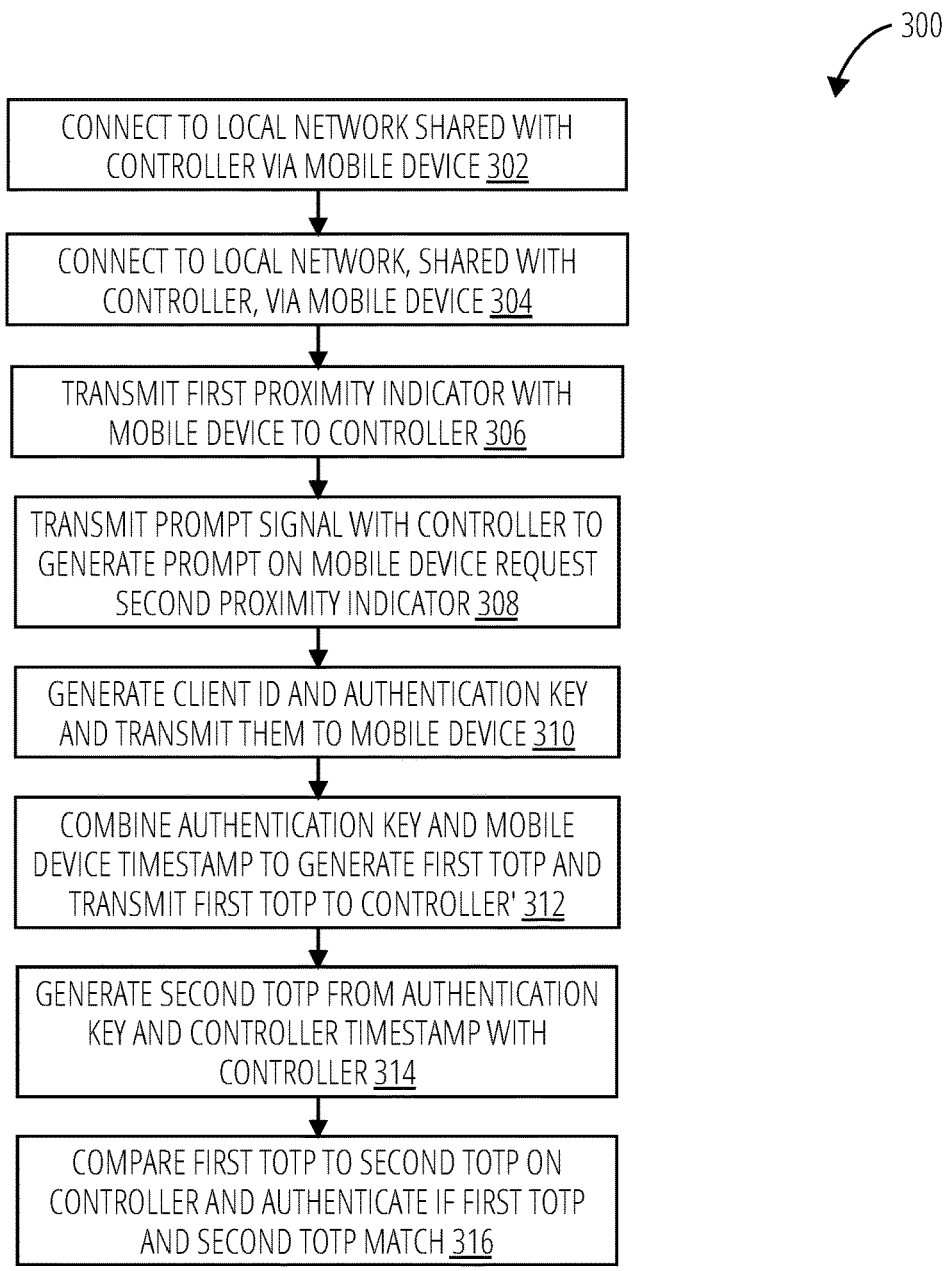
FIG. 3 illustrates an anonymous authentication process 300 in accordance with one embodiment.

Referring to FIG. 3, the block 300 connects to a local network, shared with the controller, via the mobile device (block 302).

The block 300 transmits a first proximity indicator with the mobile device to the controller (block 304).

The block 300 transmits a prompt signal with the controller to generate a prompt on the mobile device, requests a second proximity indicator (block 306).

The block 300 generates a client ID and an authentication key and transmits them to the mobile device (block 308).

The block 300 combines the authentication key and a mobile device timestamp to generate a first TOTP and transmits the first TOTP to the controller (block 310).

The block 300 generates a second TOTP from the authentication key and a controller timestamp with the controller (block 312).

The block 300 compares the first TOTP to the second TOTP on the controller and authenticates if the first TOTP and the second TOTP match (block 314).

Thus, the process connects to a local network, shared with the controller, via the mobile device. The process then transmits a first proximity indicator with the mobile device to the controller. The process then transmits a prompt signal with the controller to generate a prompt on the mobile device, requests a second proximity indicator. The process then generates a client ID and an authentication key and transmits them to the mobile device. The process then combines the authentication key and a mobile device timestamp to generate a first TOTP and transmits the first TOTP to the controller. The process then generates a second TOTP from the authentication key and a controller timestamp with the controller. The process then and compares the first TOTP to the second TOTP on the controller and authenticates if the first TOTP and the second TOTP match.

Figure 4:
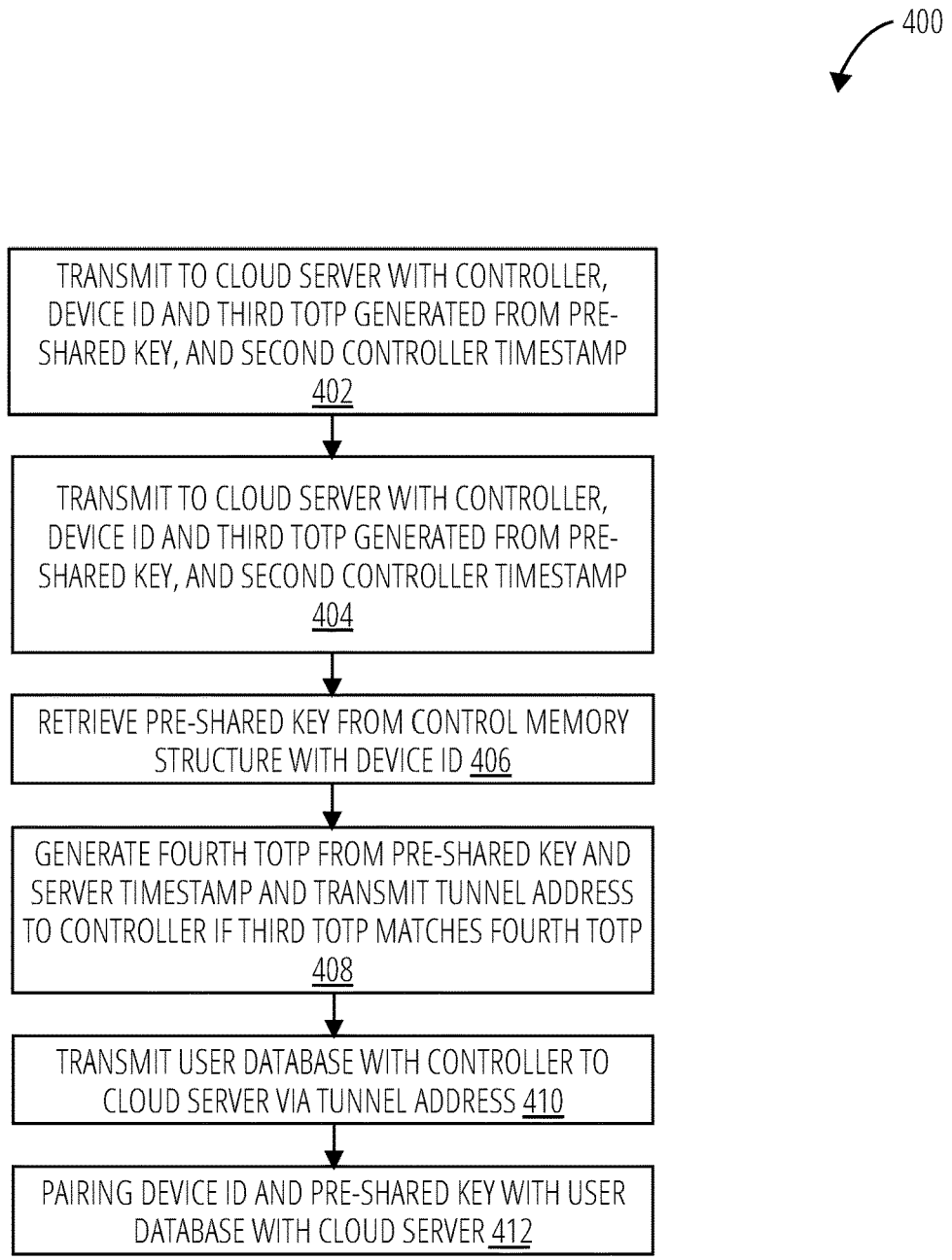
FIG. 4 illustrates an anonymous authentication process 400 in accordance with one embodiment.

Referring to FIG. 4, the block 400 transmits to the cloud server with the controller, a device ID and a third TOTP generated from a pre-shared key, and a second controller timestamp (block 402).

The block 400 retrieves the pre-shared key from a control memory structure with the device ID (block 404).

The block 400 generates a fourth TOTP from the pre-shared key and a server timestamp and transmits a tunnel address to the controller if the third TOTP matches the fourth TOTP (block 406).

The block 400 transmits a user database with the controller to the cloud server via the tunnel address (block 408).

The block 400 and pairing the device ID and the pre-shared key with the user database with the cloud server (block 410).

Thus, a process transmits to the cloud server with the controller, a device ID and a third TOTP generated from a pre-shared key, and a second controller timestamp. The process then retrieves the pre-shared key from a control memory structure with the device ID. The process then generates a fourth TOTP from the pre-shared key and a server timestamp and transmits a tunnel address to the controller if the third TOTP matches the fourth TOTP. The process then transmits a user database with the controller to the cloud server via the tunnel address. The process then and pairing the device ID and the pre-shared key with the user database with the cloud server.

Figure 5:
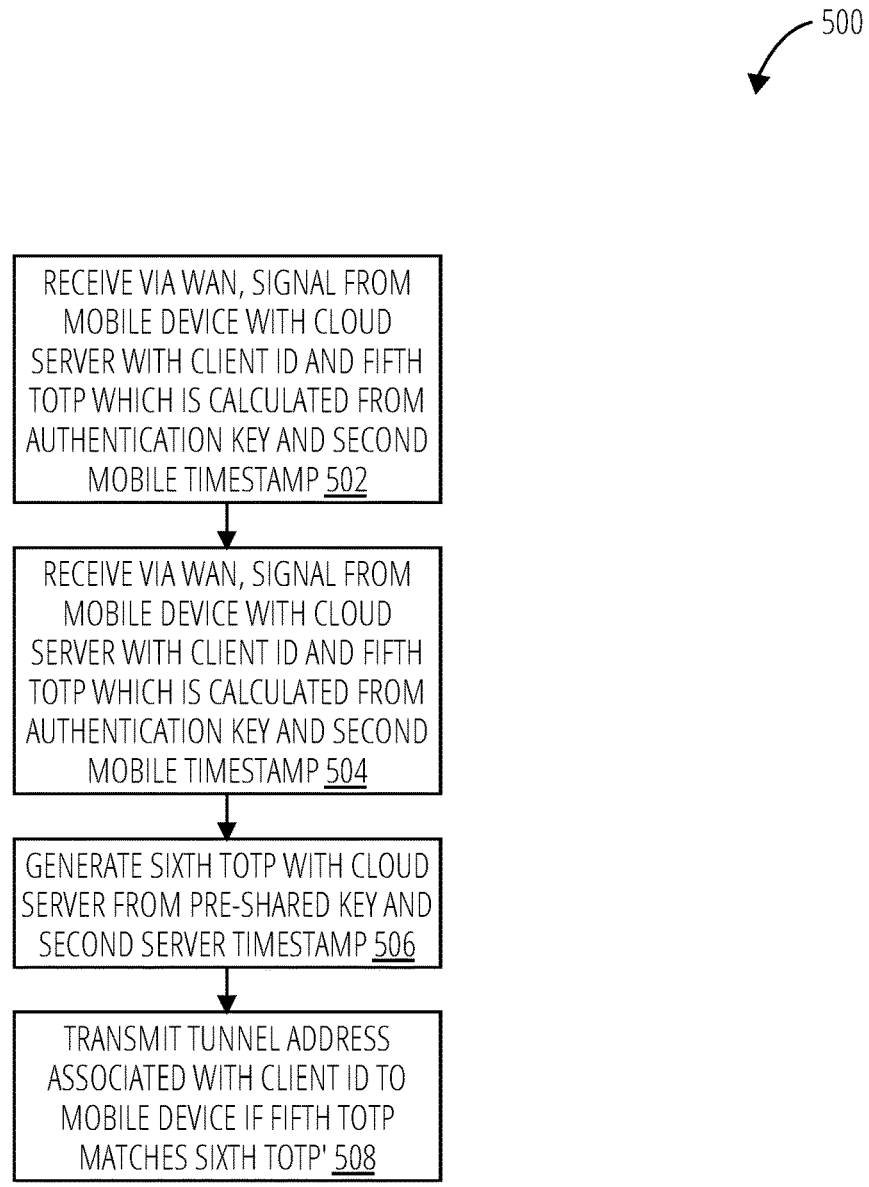
FIG. 5 illustrates an anonymous authentication process 500 in accordance with one embodiment.

Referring to FIG. 5, the routine 500 receives via a WAN a signal from the mobile device with the cloud server, with the client ID and a fifth TOTP which is calculated from the authentication key and a second mobile timestamp (block 502).

The routine 500 generates a sixth TOTP with the cloud server from the pre-shared key and a second server timestamp (block 504).

The routine 500 and transmits the tunnel address associated with the client ID to the mobile device if the fifth TOTP matches the sixth TOTP (block 506).

Thus, a process receives via a WAN a signal from the mobile device with the cloud server, with the client ID and a fifth TOTP which is calculated from the authentication key and a second mobile timestamp. The process then generates a sixth TOTP with the cloud server from the pre-shared key and a second server timestamp. The process then and transmits the tunnel address associated with the client ID to the mobile device if the fifth TOTP matches the sixth TOTP.

Figure 6:
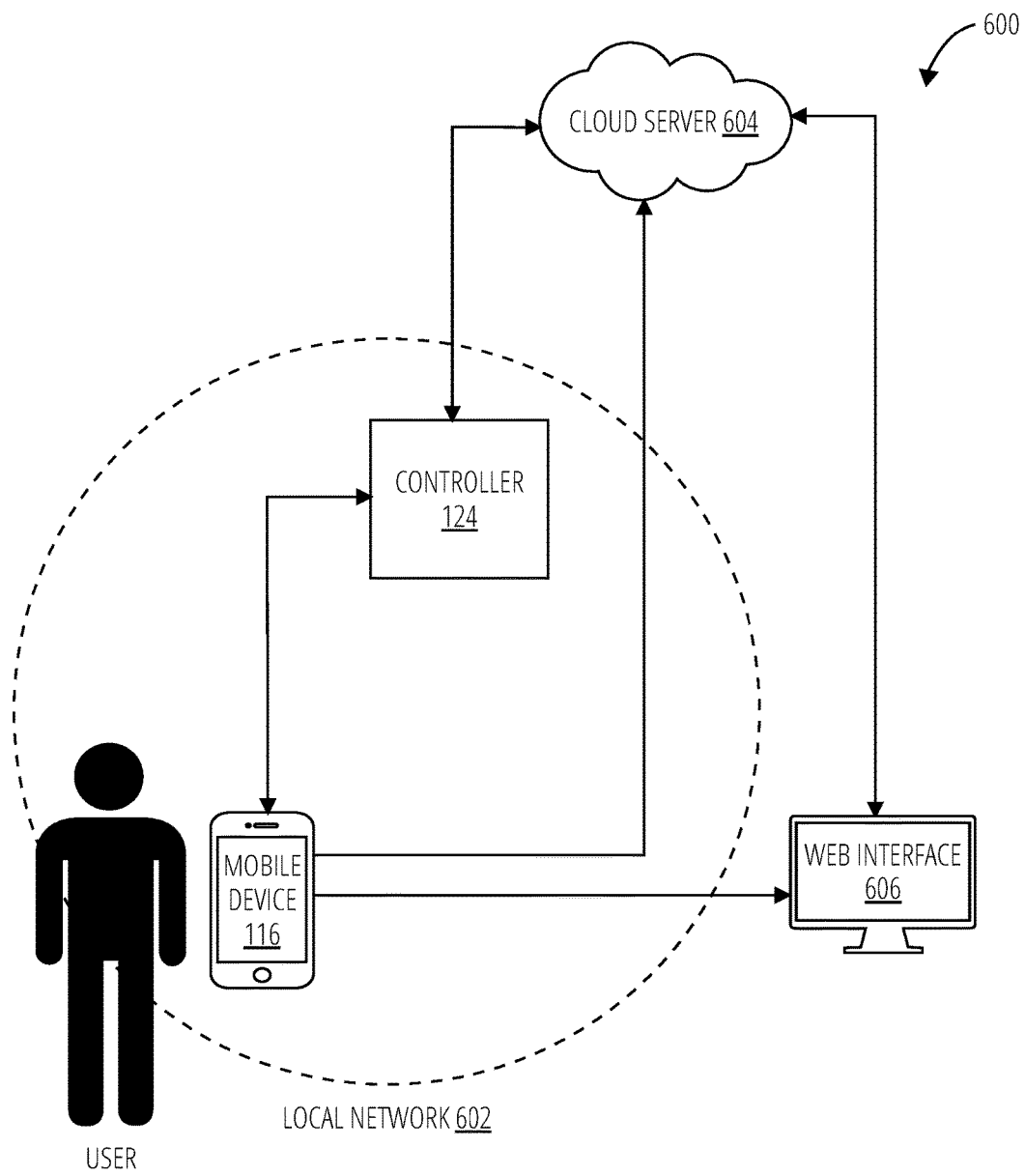
FIG. 6 illustrates an anonymous authentication system 600 in accordance with one embodiment.

Referring now to FIG. 6, an anonymous authentication system 600 comprises a mobile device 114, a controller 122, a local network 602, a cloud server 604, and a web interface 606. The mobile device 114 may connect to the controller 122 via the local network 602. The mobile device 114 may be used to authenticate the web interface 606 to the cloud server 604 and the controller 122.

Figure 7:
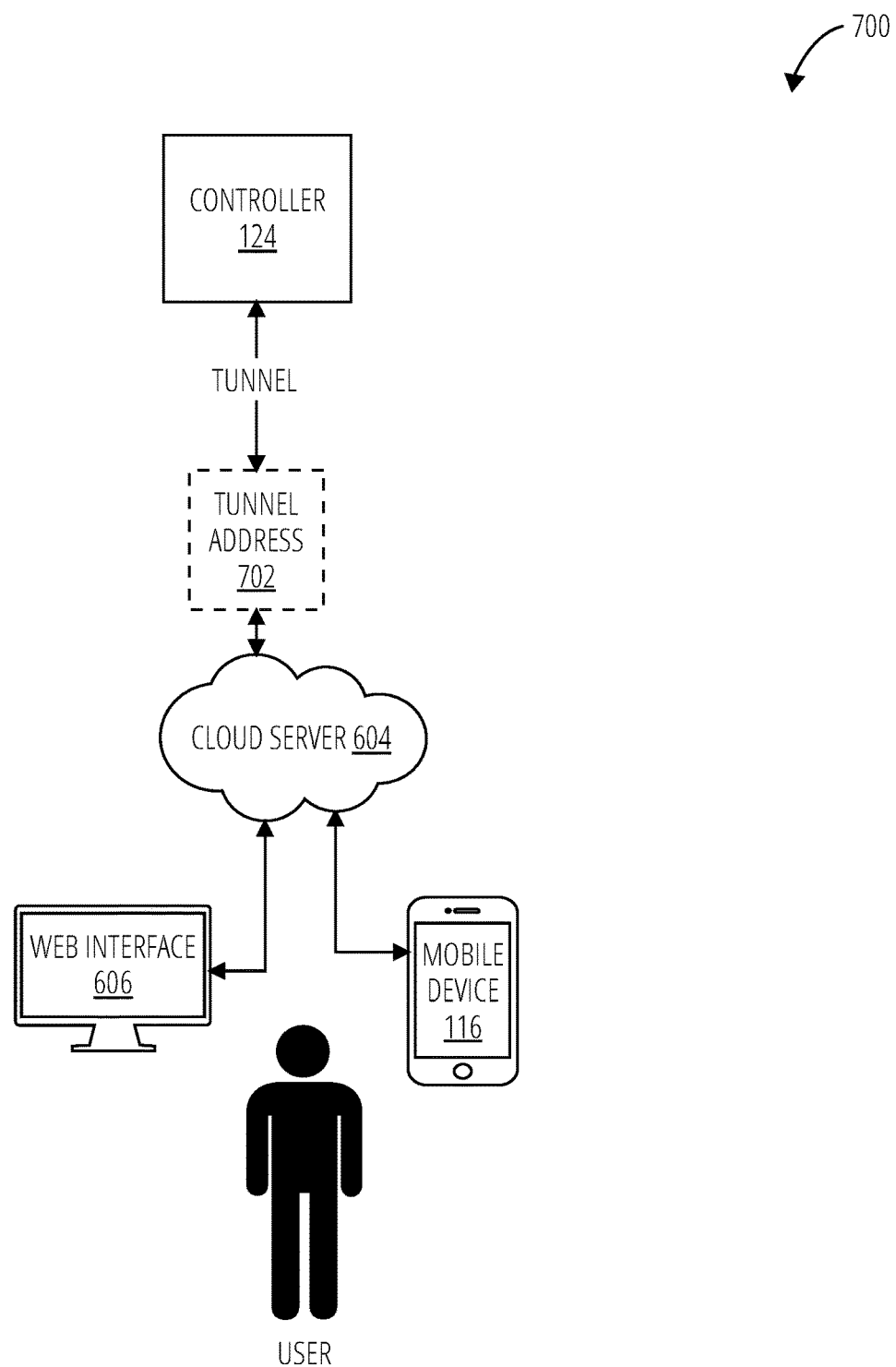
FIG. 7 illustrates an anonymous authentication system 700 in accordance with one embodiment.

Referring to FIG. 7, an anonymous authentication system 700 comprises a mobile device 114, a controller 122, a cloud server 604, a web interface 606, and a tunnel address 702. The mobile device 114 and the web interface 606 authenticate to the controller 122 and the cloud server 604 acts as a proxy connecting the mobile device 114 and the web interface 606 to the controller 122.

Figure 8:
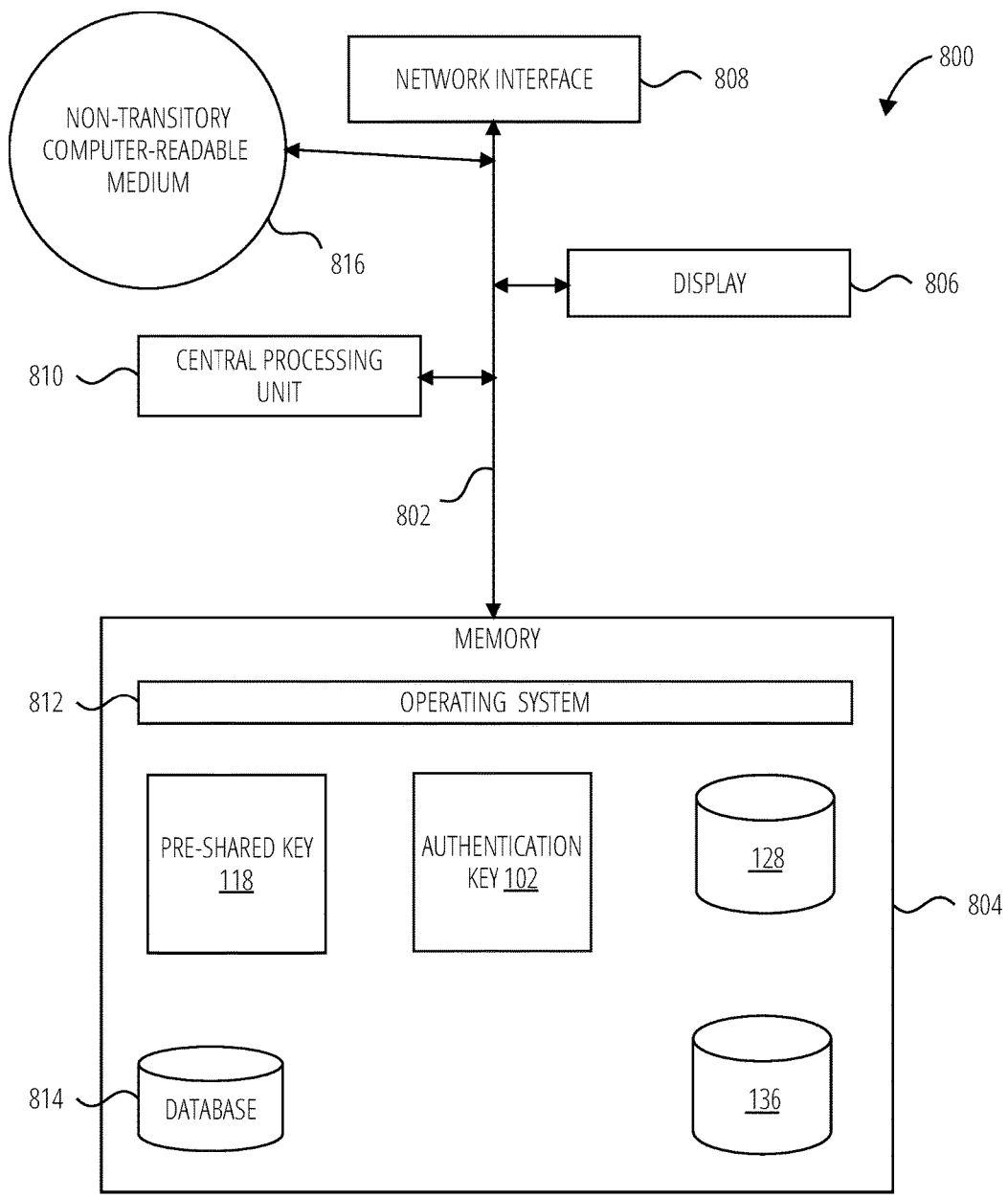
FIG. 8 illustrates a system 800 in accordance with one embodiment.

Referring to FIG. 8, a system 800 comprises an authentication key 102, a pre-shared key 116, a setup control memory structure 132, a bus 802, a memory 804, a display 806, a network interface 808, a central processing unit 810, an operating system 812, a database 814, a non-transitory computer-readable medium 816, and a user control memory structure 818.

Figure 9:
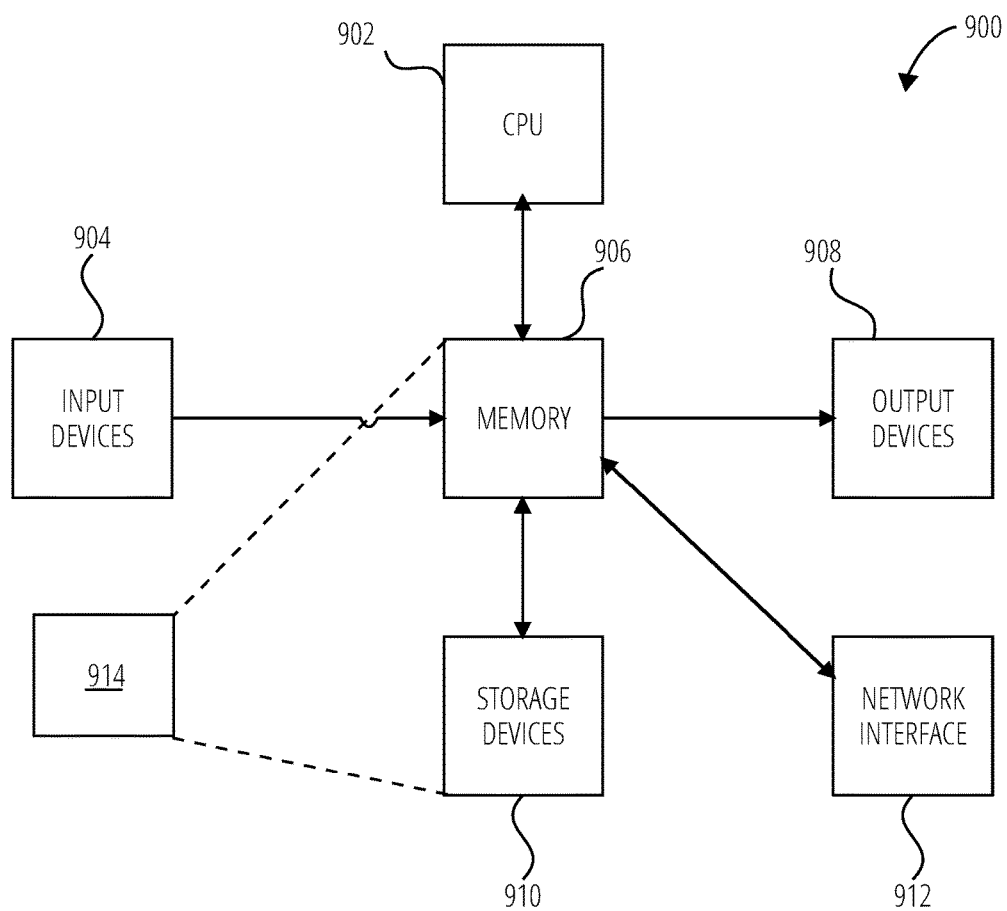
FIG. 9 illustrates a digital apparatus 900 in accordance with one embodiment.

FIG. 9 illustrates an embodiment of a digital apparatus 900 to implement components and process steps of the system described herein.

Input devices 904 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 904 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 904 are provided via various machine signal conductors (e.g., busses or network interfaces) and circuits to memory 906.

The memory 906 is typically what is known as a first or second level memory device, providing for storage (via configuration of matter or states of matter) of signals received from the input devices 904, instructions and information for controlling operation of the CPU 902, and signals from storage devices 910.

The memory 906 and/or the storage devices 910 may store computer-executable instructions and thus forming logic 914 that when applied to and executed by the CPU 902 implement embodiments of the processes disclosed herein.

Information stored in the memory 906 is typically directly accessible to the CPU 902 of the device. Signals input to the device cause the reconfiguration of the internal material/energy state of the memory 906, creating in essence a new machine configuration, influencing the behavior of the digital apparatus 900 by affecting the behavior of the CPU 902 with control signals (instructions) and data provided in conjunction with the control signals.

Second or third level storage devices 910 may provide a slower but higher capacity machine memory capability. Examples of storage devices 910 are hard disks, optical disks, large capacity flash memories or other non-volatile memory technologies, and magnetic memories.

The CPU 902 may cause the configuration of the memory 906 to be altered by signals in storage devices 910. In other words, the CPU 902 may cause data and instructions to be read from storage devices 910 in the memory 906 from which may then influence the operations of CPU 902 as instructions and data signals, and from which it may also be provided to the output devices 908. The CPU 902 may alter the content of the memory 906 by signaling to a machine interface of memory 906 to alter the internal configuration, and then converted signals to the storage devices 910 to alter its material internal configuration. In other words, data and instructions may be backed up from memory 906, which is often volatile, to storage devices 910, which are often non-volatile.

Output devices 908 are transducers which convert signals received from the memory 906 into physical phenomenon such as vibrations in the air, or patterns of light on a machine display, or vibrations (i.e., haptic devices) or patterns of ink or other materials (i.e., printers and 3-D printers).

The network interface 912 receives signals from the memory 906 and converts them into electrical, optical, or wireless signals to other machines, typically via a machine network. The network interface 912 also receives signals from the machine network and converts them into electrical, optical, or wireless signals to the memory 906.

Terms used herein should be accorded their ordinary meaning in the relevant arts, or the meaning indicated by their use in context, but if an express definition is provided, that meaning controls.

"Circuitry" herein refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" herein refers to software logic embodied as processor-executable instructions stored in read-only memories or media.

"Hardware" herein refers to logic embodied as analog or digital circuitry.

"Logic" herein refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" herein refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A method comprising:
   authenticating a mobile device to a controller comprising:
      connecting to a local network, shared with the controller, via the mobile device; transmitting a first proximity indicator with the mobile device to the controller; transmitting a prompt signal with the controller to generate a prompt on the mobile device, requesting a second proximity indicator;
      generating a client identification (ID) and an authentication key and transmitting them to the mobile device;
      combining the authentication key and a mobile device timestamp to generate a first Time-based One-Time Password (TOTP) and transmitting the first TOTP to the controller;
      generating a second TOTP from the authentication key and a controller timestamp with the controller; and
      comparing the first TOTP to the second TOTP on the controller and authenticating if the first TOTP and the second TOTP match; authenticating the controller to a cloud server comprising:
   transmitting to the cloud server with the controller, a device ID and a third TOTP generated from a pre-shared key, and a second controller timestamp;
   retrieving the pre-shared key from a control memory structure with the device ID; generating a fourth TOTP from the pre-shared key and a server timestamp and transmitting a tunnel address to the controller if the third TOTP matches the fourth TOTP;
   transmitting a user database with the controller to the cloud server via the tunnel address; and
   pairing the device ID and the pre-shared key with the user database with the cloud server; and authenticating the mobile device to the cloud server comprising:
receiving via a Wide Area Network (WAN) a signal from the mobile device with the cloud server, with the client ID and a fifth TOTP which is calculated from the authentication key and a second mobile timestamp;
generating a sixth TOTP with the cloud server from the pre-shared key and a second server timestamp; and
transmitting the tunnel address associated with the client ID to the mobile device if the fifth TOTP matches the sixth TOTP.

2. The method of claim 1 wherein the mobile device connects to the controller utilizing the cloud-server as a proxy.

3. The method of claim 1 wherein the second proximity indicator is a physical interaction.

4. The method of claim 1 wherein the authentication key is recalculated after a specified time window.

5. The method of claim 1 wherein the first proximity indicator is a visual identifier.

6. The method of claim 1 the first proximity indicator is an electromagnetic signal.

7. The method of claim 1 wherein the mobile device is used to authenticate a web session by inputting a second visual identifier from a web interface and transmitting it to the cloud server.

8. The method of claim 1 wherein the authentication key is utilized to calculate a TOTP to authenticate the controller to the cloud-server.

9. The method of claim 1 wherein the pre-shared key and the controller timestamp is utilized to calculate a TOTP to authenticate the mobile device to the cloud server.

10. The method of claim 1 wherein the cloud server may send a time synchronization signal to the controller if the controller and the cloud server times are not synchronized.

11. A computing apparatus, the computing apparatus comprising: a processor; and
a memory storing instructions that, when executed by the processor, configure the apparatus to:
authenticate a mobile device to a controller comprising:
connect to a local network, shared with the controller, via the mobile device;
transmit a first proximity indicator with the mobile device to the controller;
transmit a prompt signal with the controller to generate a prompt on the mobile device, requesting a second proximity indicator;
generate a client identification (ID) and an authentication key and transmitting them to the mobile device;
combine the authentication key and a mobile device timestamp to generate a first Time-based One-Time Password (TOTP) and transmitting the first TOTP to the controller;
generate a second TOTP from the authentication key and a controller timestamp with the controller; and
compare the first TOTP to the second TOTP on the controller and authenticating if the first TOTP and the second TOTP match; authenticate the controller to a cloud server comprising:
transmit to the cloud server with the controller, a device ID and a third TOTP generated from a pre-shared key, and a second controller timestamp;
retrieve the pre-shared key from a control memory structure with the device ID;
generate a fourth TOTP from the pre-shared key and a server timestamp and transmitting a tunnel address to the controller if the third TOTP matches the fourth TOTP;
transmit a user database with the controller to the cloud server via the tunnel address; and
pair the device ID and the pre-shared key with the user database with the cloud server; and
authenticate the mobile device to the cloud server comprising:
receive via a Wide Area Network (WAN) a signal from the mobile device with the cloud server, with the client ID and a fifth TOTP which is calculated from the authentication key and a second mobile timestamp;
generate a sixth TOTP with the cloud server from the pre-shared key and a second server timestamp; and
transmit the tunnel address associated with the client ID to the mobile device if the fifth TOTP matches the sixth TOTP.

* * * * *